UNITED STATES PATENT OFFICE.

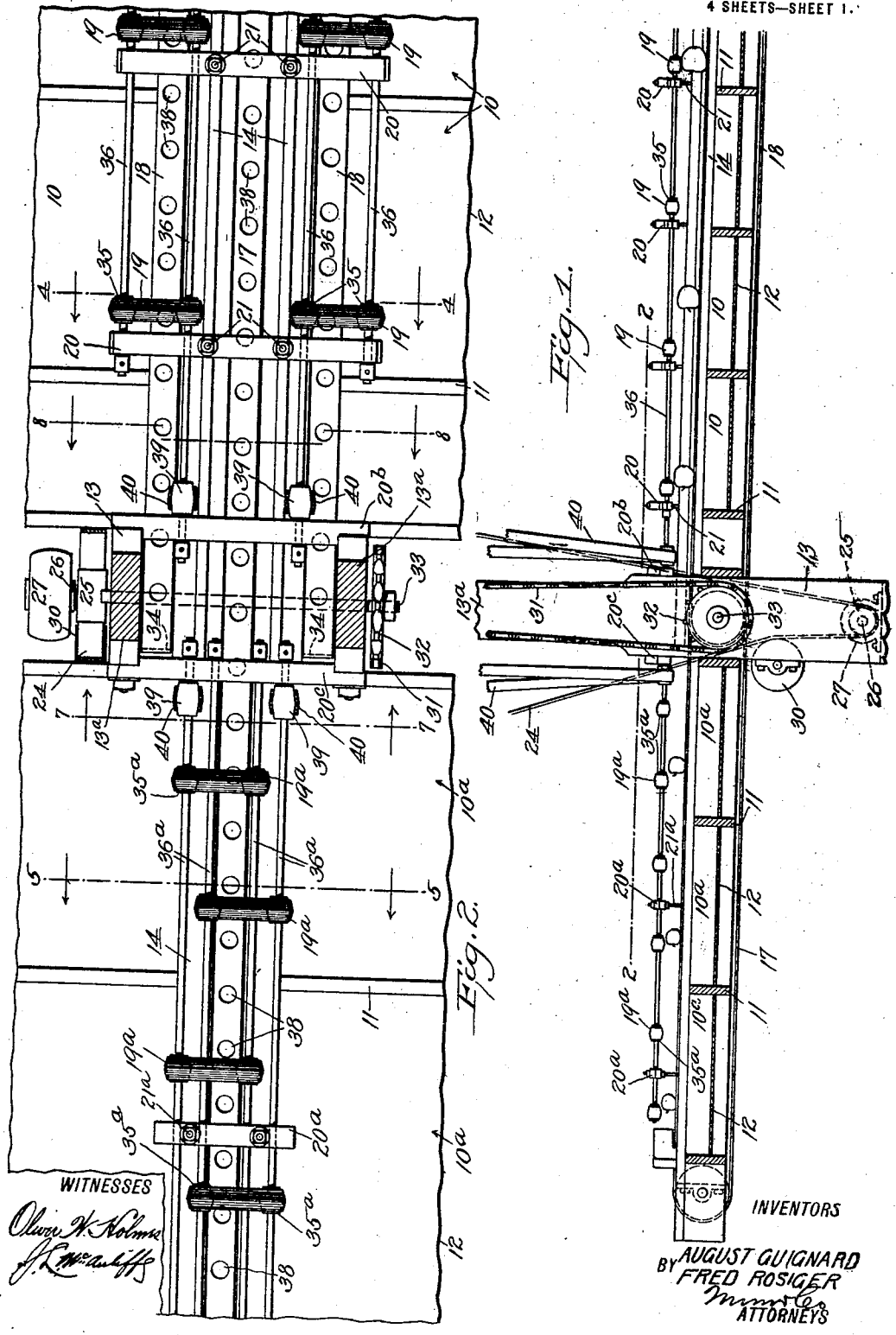

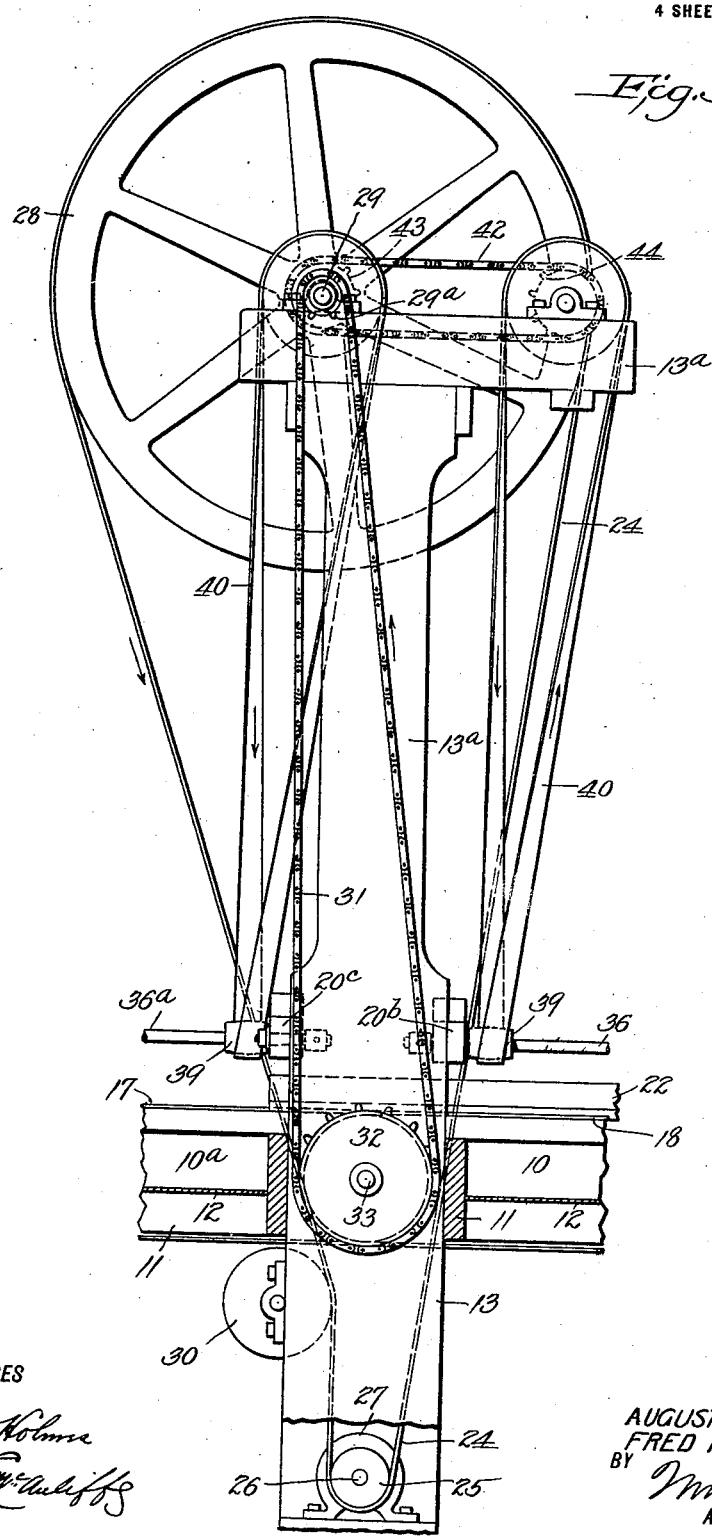

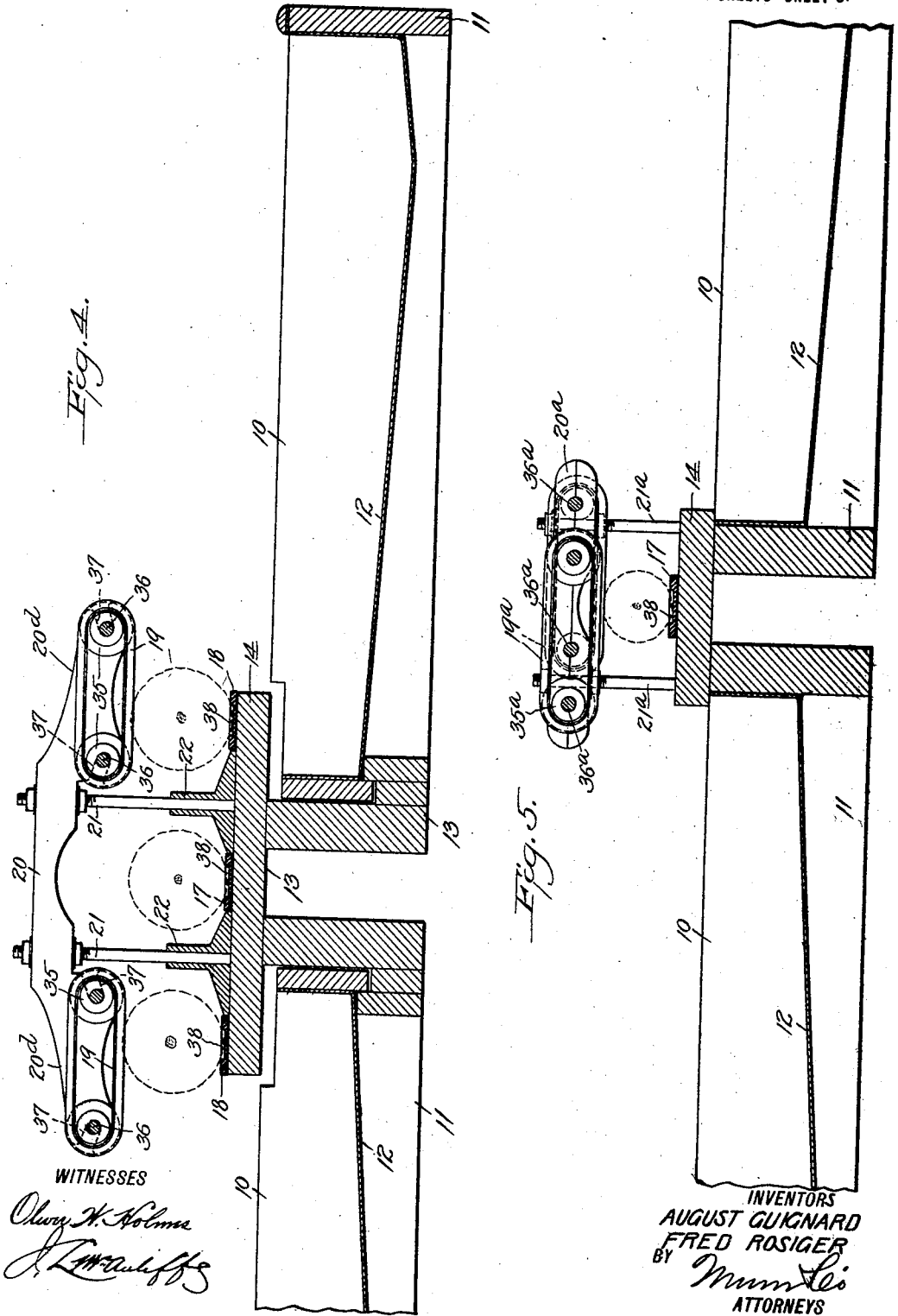

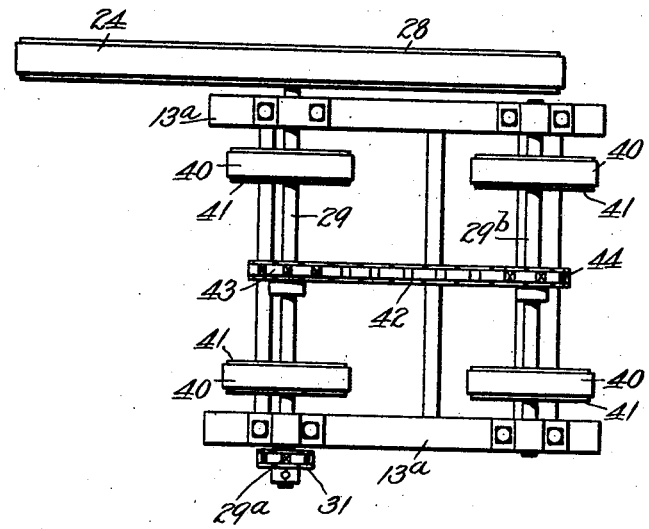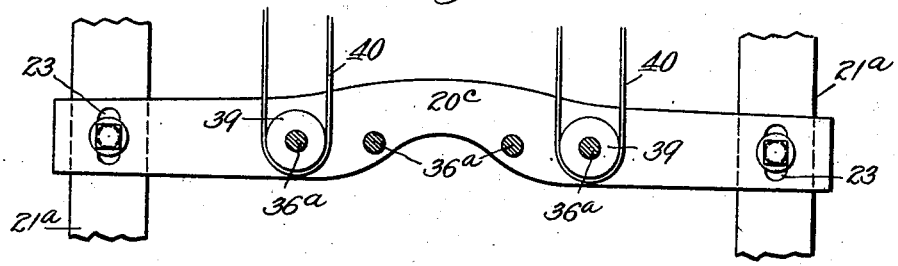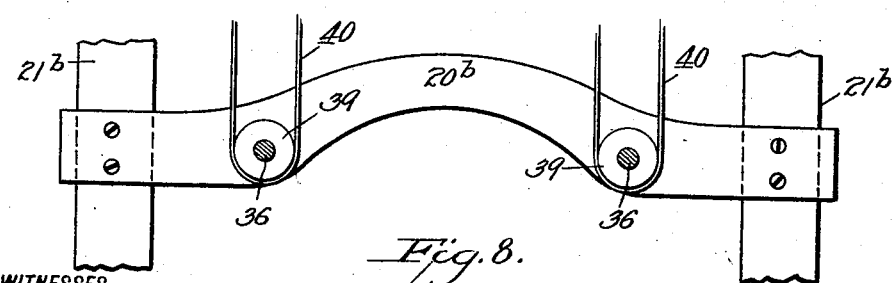

AUGUST GUIGNARD AND FRED ROSIGER, OF HOOD RIVER, OREGON.

FRUIT-GRADER.

1,318,990.   Specification of Letters Patent.   Patented Oct. 14, 1919.

Application filed March 18, 1919. Serial No. 283,304.

*To all whom it may concern:*

Be it known that we, AUGUST GUIGNARD and FRED ROSIGER, citizens of the United States, and residents of Hood River, in the county of Hood River and State of Oregon, have invented a new and Improved Fruit-Grader, of which the following is a description.

Our invention relates to the type of fruit grading machines in which a plurality of conveyer belts travel longitudinally of the machine to convey the fruits placed thereon and transverse belts disposed above the carrier belts at various elevations serve respectively to select fruit of predetermined sizes, to discharge the fruit by frictional engagement thereof into bins at opposite sides of the carrier belts. The general features thus outlined are known.

The purpose of our invention is to provide in a machine of the indicated type, carrier belts having depressions therein serving to better retain the fruit against displacement and to provide transverse belts running over coned pulleys in a manner to give the working face of the belt a V-shaped cross section, whereby the fruit approaching the transverse belts will be engaged by the latter after the fruit has passed the side edge of the transverse belt insuring thereby a discharge of the fruit in a given definite direction to the bins.

The invention contemplates also novel bearings for the drive shafts on the transverse belts.

Reference is to be had to the accompanying drawings forming a part of this specification, it being understood that the drawings are merely illustrative of one example of the invention.

Figure 1 is a side elevation of a portion of a fruit grading machine embodying our invention;

Fig. 2 is a sectional plan view of a portion of said machine on an enlarged scale, the section being taken on the line 2—2, Fig. 1;

Fig. 3 is a partly sectional side elevation of the drive means;

Figs. 4 and 5 are fragmentary cross sections on the lines 4—4, and 5—5, Fig. 2;

Fig. 6 is a plan view of the drive means, parts being omitted in the interest of clearness;

Figs. 7 and 8 are details in cross section as indicated by the lines 7—7 and 8—8, Fig. 2.

In carrying out our invention in accordance with the illustrated example, a series of bins 10, 10$^a$ are provided at opposite sides of the machines, the sides and outer ends of the bins being defined by boards 11, said ends having bottoms 12 of canvas. The bins are embodied in a suitable supporting or frame structure designated generally by the numeral 13. A table 14 forms part of said structure and advantageously overlaps the inner ends of the respective bins. On said table, runs longitudinally a central carrier belt 17 and additional belts 18, at the sides of the central belt, of shorter length. The transverse carrier belts 19 are arranged over the respective side belts 18, successive belts 19 being of gradually decreasing heights from the feed end of the machine to select in succession fruit of decreasing size. A series of rigid transverse heads 20 are disposed above the table 14 and supported by any suitable manner as by upright bolts 21, said heads permitting the free passage of the fruit carried by the central belt 17, the outer ends of said heads carrying the transverse belts 19 and their drive shafts as hereinafter explained.

Transverse belts 19$^a$ are disposed beyond the belts 19 and directly above the central carrier belt 17 and preferably are in staggered relation, alternate belts 19$^a$ being driven to the right and left to discharge the fruit from the central belt to opposite side bins. The respective longitudinal belts 17, 18 are separated by longitudinal guards or barriers 22, (Fig. 4). In addition to the heads 20, heads 20$^a$ are provided above the central belt 17 to support the drive shafts of the transverse belts 19$^a$, as hereinafter referred to, said head being supported by bolts 21$^a$ or the like.

It will be understood that any suitable drive means may be employed for the various belts. As one example of drive means, a belt 24 runs over the pulley 25 on the shaft 26 of a motor 27 and upwardly over a large pulley 28 supported overhead on a super-structure 13$^a$. An idler 30 may be provided against which the belt 24 runs between the pulleys 27 and 28. On the shaft 29 of said overhead pulley is a sprocket wheel 29$^a$ over which a chain belt 31 runs to a sprocket 32 on the transverse shaft 23 supported in the structure 13 below the level of the table 14. On the shaft 33 are drive pulleys 34 for the side belts 18. The central belt 17 is driven by any suitable means from the shaft 33, the drive means not being shown, since not forming part of our invention.

The transverse belts 19 are advantageously made of elastic webbing and they are stretched over pulleys 35, each of which is reversely coned, the result being that said belts are made trough-shaped or V-shaped in cross section, thereby the parts presenting an inclined side surface to the approaching fruit so that the fruit will clear the near side edge of the belt and be engaged by the latter inward from said side edge, whereby to insure a displacement of the apple in a definite direction toward the bin. The pulleys 35 of each series of transverse belts 19 pertaining to a particular longitudinal belt 18 are mounted on parallel shafts 36 and said shafts have bearings in auxiliary heads 20$^d$ carried by the ends of the heads 20. It will be observed from Fig. 4 that the slots 37 of each pair of shafts 36 are oblique to each other and extend from the ends of the auxiliary heads 20$^d$, the arrangement facilitating the entrance and removal of the shafts from the bearings and the elasticity of the belts serving to retain their shafts in said bearing slots. Each carrier belt is provided with round or approximately round depressions 38 which are cut partially through the material of the belts 17. Each belt presents a longitudinal row of these spaced depressions and each is adapted to form a rest for the separate apples, pears, or the like, which, it is to be understood, are laid on the sides when placed on the belt, the calix of the fruit being forward. The transverse belts 19$^a$ associated with the longitudinal belt 17 are stretched over reversely coned pulleys 35$^a$, said pulleys being mounted on parallel shafts 36$^a$, four of said shafts being provided for the two staggered series of belts 19$^a$. The various shafts 36, 36$^a$ are driven as follows: Drive pulleys 39 thereon which may be reversely coned, receive belts 40, which extend upwardly over pulleys 41 respectively on the shaft 29 and a parallel shaft 29$^b$, there being four of such belts 40 for the various shafts 36, 36$^a$. The belt 42 runs over a sprocket wheel 43 on a shaft 29 and a sprocket wheel 44 on the shaft 29$^b$, thereby driving the latter shaft. The particular drive means shown, however, forms no part of our present invention.

We would state in conclusion that while the illustrated example constitutes a practical embodiment of our invention, we do not limit ourselves strictly to the mechanical details herein illustrated, since manifestly the same can be considerably varied without departure from the spirit of the invention as defined in the appended claims.

Having thus described our invention, we claim as new, and desire to secure by Letters Patent:

1. A fruit grader including a carrier belt having a longitudinal row of depressions of a uniform size in the working surface thereof presenting seats for the fruit, said depressions being spaced from each other to receive individual fruits, and prevent the fruit from rolling on the surface of the belt together with selective means disposed along said carrier belt and adapted to selectively dislodge the fruit from said depressions.

2. A fruit grader including a longitudinal carrier belt, together with transverse selective belts above the longitudinal belt, and means giving said transverse belts a V-shaped cross section at the under side thereof.

3. A fruit grader including a longitudinal carrier belt, transverse selective belts above the longitudinal belt, and oppositely coned pulleys over which said transverse belts are stretched, the under runs of said belts having a V-shaped cross section between the pulleys to present a receding inclined side surface to the fruit traveling toward said transverse belts.

4. A fruit grader including a longitudinal carrier belt, and transverse selective belts above the carrier belts, said transverse belts being V-shaped in the under run thereof to present an inclined working surface toward the carrier belt to permit the fruit to clear the rear edge of the belt before being engaged by the latter.

5. A fruit grader including a longitudinal carrier belt, transverse, endless, elastic, selective belts, above the carrier belt, pulleys over which the transverse belts are stretched, shafts carrying said pulleys, and overhead supports having oppositely disposed oblique slots forming bearings for said shafts.

6. In a fruit grading machine, a longitudinal carrier belt, endless elastic transverse belts above said carrier belts, and oppositely coned pulleys over which said transverse belts are stretched, said transverse belts between said pulleys being V-shaped at the under side.

AUGUST GUIGNARD.
FRED ROSIGER.